US 9,086,236 B2

(12) United States Patent
Hirata

(10) Patent No.: US 9,086,236 B2
(45) Date of Patent: *Jul. 21, 2015

(54) MOLDING FLASK FOR A MOLDING MACHINE AND A MOLDING PROCESS USING THE MOLDING FLASK

(75) Inventor: Minoru Hirata, Toyokawa (JP)

(73) Assignee: SINTOKOGIO, LTD., Nagoya-Shi (JP)

(*) Notice: Subject to any disclaimer, the term of this patent is extended or adjusted under 35 U.S.C. 154(b) by 2152 days.

This patent is subject to a terminal disclaimer.

(21) Appl. No.: 10/586,157

(22) PCT Filed: Jan. 20, 2005

(86) PCT No.: PCT/JP2005/000691
§ 371 (c)(1),
(2), (4) Date: Aug. 1, 2008

(87) PCT Pub. No.: WO2005/068107
PCT Pub. Date: Jul. 28, 2005

(65) Prior Publication Data
US 2008/0314545 A1 Dec. 25, 2008

(30) Foreign Application Priority Data

Jan. 20, 2004 (JP) .................. 2004-011276
May 20, 2004 (JP) .................. 2004-150475
Dec. 27, 2004 (JP) .................. 2004-375103

(51) Int. Cl.
B22C 11/10 (2006.01)
B22C 15/02 (2006.01)
(Continued)

(52) U.S. Cl.
CPC . F26B 5/00 (2013.01); B01D 21/06 (2013.01); B01D 21/245 (2013.01);
(Continued)

(58) Field of Classification Search
CPC ........ B22C 11/02; B22C 11/10; B22C 15/00; B22C 15/02; B22C 15/08; B22C 21/00; B22C 21/10
USPC ................. 164/40, 169, 211, 37, 29
See application file for complete search history.

(56) References Cited

U.S. PATENT DOCUMENTS 409,471 A * 8/1889 Leeder .................. 164/182
3,589,431 A * 6/1971 Fellows ................. 164/172
(Continued)

FOREIGN PATENT DOCUMENTS

DE 33 12 539 C1 3/1984
JP 59073148 4/1984
(Continued)

OTHER PUBLICATIONS

Federal Public Service Ministry of the Development, Industry and Foreign Affairs Brazilian Patent and Trademark Office, "Technical Examination Report," Jun. 8, 2012, 2 pages.

Primary Examiner — Kevin P Kerns
Assistant Examiner — Jacky Yuen
(74) Attorney, Agent, or Firm — Finnegan, Henderson, Farabow, Garrett & Dunner, L.L.P.

(57) ABSTRACT

A flask for containing mold sand within it prevents any mold shifting or mold dropping. Each of an upper flask 2 and a lower flask 3 includes a body that defines an opening in which a sand mold is to be molded. The body has at least one inlet 101 for introducing the mold sand into the opening. Two flanges 102 are extended from the body such that they are opposed to each other across the opening. Each flange has a through bore. The flask also includes engaging members for engaging an actuator in the outside of the flask such that a force or forces from said actuator could be transmitted to the flask. An upper flask 104 and a lower flask 105 are opposed to each other across a pattern plate 107. They are integrally assembled to make a flask unit by means of a pair of connecting rods 106 that are fitted in each bore.

7 Claims, 8 Drawing Sheets

(51) Int. Cl.

| | | |
|---|---|---|
| *B22C 21/00* | (2006.01) | |
| *F26B 5/00* | (2006.01) | |
| *B22C 15/08* | (2006.01) | |
| *B22C 21/10* | (2006.01) | |
| *B22C 15/06* | (2006.01) | |
| *B22C 15/24* | (2006.01) | |
| *B22C 15/28* | (2006.01) | |
| *B01D 21/06* | (2006.01) | |
| *B01D 21/24* | (2006.01) | |
| *B01D 21/26* | (2006.01) | |
| *B01F 5/10* | (2006.01) | |
| *B01F 7/16* | (2006.01) | |
| *B01F 7/18* | (2006.01) | |
| *B01F 7/28* | (2006.01) | |
| *B01F 13/10* | (2006.01) | |
| *B01F 15/00* | (2006.01) | |
| *B02C 17/00* | (2006.01) | |
| *B02C 17/16* | (2006.01) | |
| *B09B 3/00* | (2006.01) | |
| *C02F 1/38* | (2006.01) | |
| *F26B 17/10* | (2006.01) | |
| *F26B 17/24* | (2006.01) | |
| *C02F 103/08* | (2006.01) | |

(52) U.S. Cl.
CPC ........... *B01D 21/2444* (2013.01); *B01D 21/26* (2013.01); *B01F 5/104* (2013.01); *B01F 7/1625* (2013.01); *B01F 7/18* (2013.01); *B01F 7/285* (2013.01); *B01F 13/1011* (2013.01); *B01F 13/1041* (2013.01); *B01F 15/00974* (2013.01); *B01F 15/00987* (2013.01); *B02C 17/007* (2013.01); *B02C 17/16* (2013.01); *B02C 17/163* (2013.01); *B09B 3/00* (2013.01); *B22C 11/10* (2013.01); *B22C 15/02* (2013.01); *B22C 15/06* (2013.01); *B22C 15/08* (2013.01); *B22C 15/24* (2013.01); *B22C 15/28* (2013.01); *B22C 21/10* (2013.01); *C02F 1/38* (2013.01); *F26B 17/107* (2013.01); *F26B 17/24* (2013.01); *B01D 21/267* (2013.01); *B01F 2215/005* (2013.01); *B01F 2215/0014* (2013.01); *B01F 2215/0032* (2013.01); *B01F 2215/0481* (2013.01); *C02F 2103/08* (2013.01); *C02F 2301/024* (2013.01); *C02F 2301/026* (2013.01)

(56) References Cited

U.S. PATENT DOCUMENTS

| | | | | |
|---|---|---|---|---|
| 3,730,250 | A * | 5/1973 | Fellows | 164/22 |
| 4,411,303 | A * | 10/1983 | Shioda | 164/182 |
| 5,246,058 | A * | 9/1993 | Murata | 164/182 |
| 5,409,052 | A * | 4/1995 | Kaneto et al. | 164/151.2 |
| 6,499,531 | B1 * | 12/2002 | Knudsen | 164/211 |

FOREIGN PATENT DOCUMENTS

| | | |
|---|---|---|
| JP | 4041047 | 2/1992 |
| JP | 7016705 | 1/1995 |
| JP | 9052151 | 2/1997 |

* cited by examiner

MOLDING FLASK FOR A MOLDING MACHINE AND A MOLDING PROCESS USING THE MOLDING FLASK

FIELD OF THE INVENTION

This invention relates to a flask of a molding machine for molding a mold with molding sand, and a method for molding a mold using the invented flask.

BACKGROUND OF THE INVENTION

Flaskless molding machines are known as disclosed in such as Japanese Patent Early-Publication No. 7-16705, filed Jul. 2, 1993, assigned to the present applicant. The flaskless molding machines employ a flaskless molding process, where a molded mold is removed from a pair of flasks (an upper flask and a lower flask), and its sides are covered by mold jackets, if needed, such that it is then poured.

In the conventional flasks of the molding machine, as shown in the above publication, the paired upper and lower flasks are cantilevered supported such that they are connected to each other at just one of their sides. For this reason, an undesirable gap can appear between the upper flask and the lower flask at the side that is opposed to the connecting side when they are caused to overlap, while a gap can appear therebetween at the connecting side when a pattern is drawn. This results in that the face of the mold cannot be disposed in parallel with the mating face of the flask, and thus this causes a mold shift. The mold shift prevents the mold from being vertically drawn from a pattern and thus causes problems such as a mold dropping.

Although the upper flask and the lower flask with a mold therein overlap by especially using any aligning device for the mold, indeed, accuracy for the overlapping can be difficult to achieve.

SUMMARY OF THE INVENTION

Accordingly, one object of the present invention is to provide a flask that prevents a mold from shifting and a mold from dropping. The present invention also provides a molding process using the flask.

The present invention provides a flask for containing mold sand. The flask comprises:

a body that defines an opening in which a sand mold is to be molded, the body having an inlet for introducing said mold sand into the opening; and a mounting member attached to the body for mounting said flask on a plurality of connecting arms that is adapted to integrally connect one flask with another flask such that the two flasks are opposed to, and spaced apart from, each other, while they are supported by the connecting arms.

According to the present invention, a pair of said flasks is formed as a single flask unit. The one flask of the flask unit has a form that is the same as, or may differ from, that of the other flask of the flask unit.

The flask unit that is comprised of the flasks of the present invention may, if the pattern plate has patterns on both its surfaces, be incorporated in a flaskless molding machine.

Accordingly, the present invention also provides a method for molding a mold with the flaskless molding machine using the above described flasks. The method comprises the steps of:

defining a pair of molding spaces by inserting each pressing means into each opening of the pair of flasks that form the flask unit;

introducing said molding sand into the pair of molding spaces through the inlets; and molding two half-molds by pressing said introduced molding sand with the pressing members.

Preferably, the method further comprises a step of moving the flask unit between a position where the defining step is carried out and a position where the introducing step is carried out. In this case, the pressing step may be carried out on a path on which the moving flask unit is moved. The method further comprises a step of moving the pair of half-molds in the flask unit to a position where a core is to be fitted into the molded mold after the pressing step.

The flaskless molding machine that can use the method of the present invention preferably includes a rotation frame for moving the flask unit between a position where the defining step is carried out and a position where the introducing step is carried out, and a pair of driving means for driving the pair of pressing members, respectively. In this case, the driving means may be moved with the rotation frame in unison. Alternatively, the driving means may be in a fixed position. In the latter case, the rigidity of the rotation frame can be minimized. Alternatively, one of the pair of the driving means is moved with the rotation frame in unison, while the other driving means is in a fixed position. In this case, the rigidity of the rotation frame can be reduced.

The defining step may simultaneously define the pair of molding spaces. This is suitable for a case where the height of the upper flask is the same as that of the lower flask.

Alternatively, the defining step may define one molding space and another molding space at different times. This is suitable for a case where the height of the upper flask differs from that of the lower flask.

The defining step may be completed before the introducing step such that the molding rate can be increased.

If just one defining still causes an insufficient introducing of the molding sand, the introducing step may include at least one additional defining step in order to improve the introducing of the molding sand.

The present invention also provides a method for molding a mold with the flask-molding machine, using the above flask unit. The method comprises the steps of:

defining an upper molding space and a lower molding space by holding the pattern plate between an upper flask unit and a lower flask unit, and by inserting said upper and lower pressing members into each opening, which is opposed to the pattern plate, of the upper and lower flasks, respectively, in the molding machine;

positioning the upper and lower flasks, and the pattern plate at their vertical positions, and upwardly moving the inlets;

introducing the mold sand from the inlets into each molding space;

re-positioning the upper and lower flasks, and the pattern plate to their horizontal positions, while further inserting the upper and lower pressing members into each opening so as to press the mold sand in each molding space;

unloading the pattern plate from the upper and lower flasks to carry out said pattern plate from the molding machine;

overlapping said upper flask with the lower flask to define a product cavity;

transferring said upper flask unit and the lower flask unit to a pouring means for pouring, and for transferring the poured upper and lower flask units to a disassembling means for disassembling them, where they are disassembled; and sending on the disassembled said upper and lower flask units to the flask-molding machine.

In the embodiments of the invention, desirable molding sand is green molding sand using bentonite as a binder.

The foregoing and remaining parts of the scope and spirit of the present invention will be more apparent by reviewing the following descriptions of the preferred embodiment given below together with the accompanying drawings.

BRIEF DESCRIPTIONS OF THE DRAWINGS

DESCRIPTION OF THE PREFERRED EMBODIMENT

Figure 1:
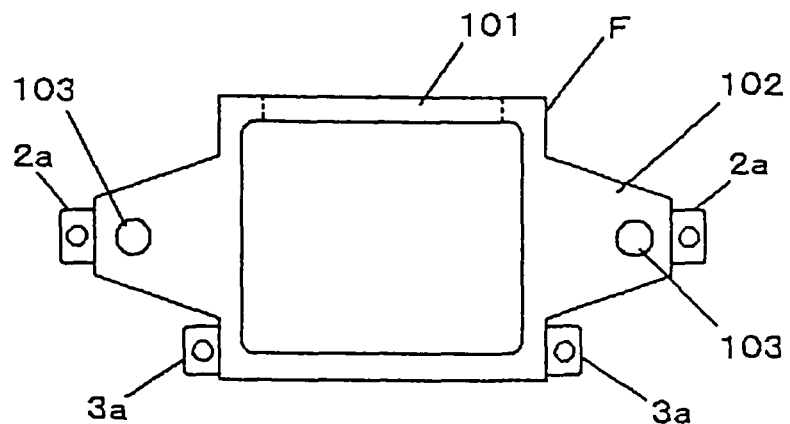
FIG. 1 shows a plane view of a flask of the present invention.

FIG. 1 shows a flask F of the present invention. In FIG. 1, two flasks F are caused to overlap. The upper flask F is provided with engaging members 2a, while the lower flask F is provided with engaging members 3a. The other arrangements of the upper flask are the same as those of the lower flask.

Each flask F includes integral peripheral walls (or a body) that define an opening. One side of the peripheral walls has at least one inlet 101 for introducing molding sand into the opening.

Flanges (mounting members) 102 are attached to the outer surfaces of a pair of opposed walls of the peripheral walls of the flask F. One through bore is bored through each flange 102 such that two bores are opposed to each other across the opening of the flask.

The flanges 102 may be integrally molded to the body of the flask F. Alternatively, the flanges 102 may be separately manufactured from the body such that they can be mechanically attached to the body. For example, the flask F of the present invention can be made from an existing flask, to act as the body and the flanges 102 that are attached to the body. In this case, the engaging members 2a, 3a of the flask F are preferably integrally molded with the flanges 102. The functions of the engaging members 2a, 3a will be described below.

Figure 2:
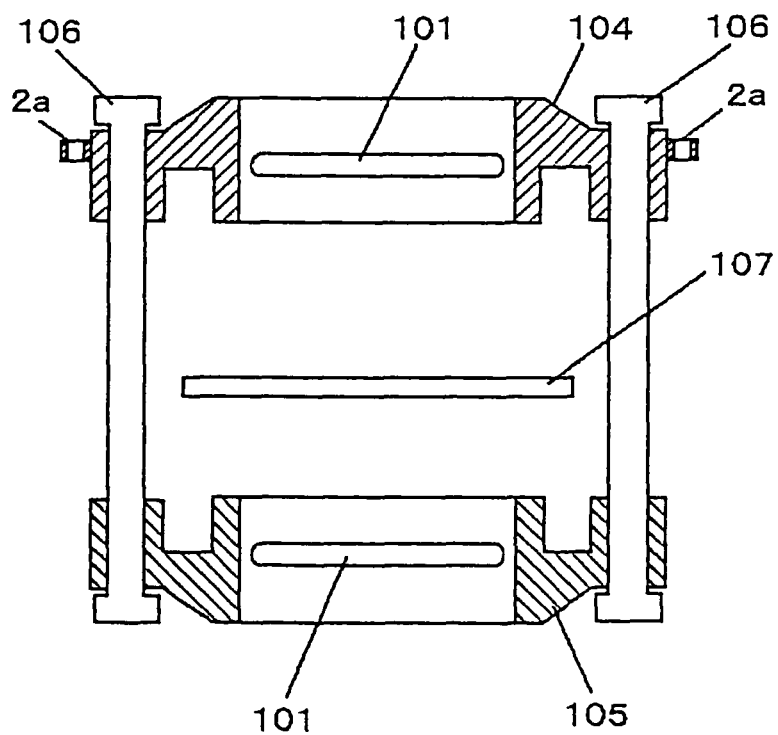
FIG. 2 shows a schematic, side view of a flask unit composed of a pair of the flasks of the invention, partly cut away.
Figure 3:
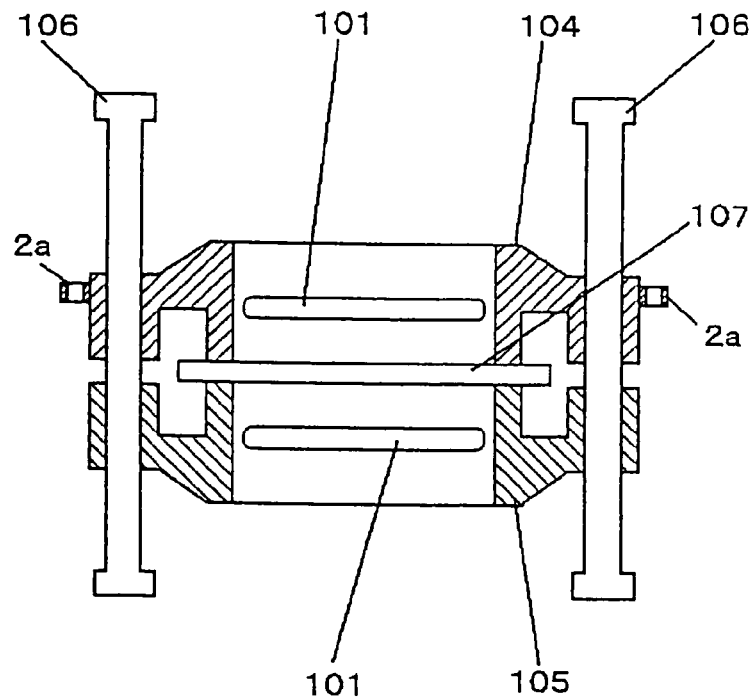
FIG. 3 shows a view similar to that of FIG. 2, where a match plate is pinched between an upper flask and a lower flask.

As shown in FIGS. 2 and 3, a flask unit includes an upper flask 104 and a lower flask 105. Each flask has arrangements that are the same as those of the flask F of the present invention. Because the profile of the upper flask 104 need not be the same as that of the lower flask 105, they may differ.

Connecting rods 106 are to integrally connect the upper flask 104 to the lower flask 105. The connecting rods 106 are slidingly inserted into the bores 103 of the paired upper and lower flasks 104 and 105. During the actual molding process, the paired upper and lower flasks 104 and 105 move up and down by following the connecting rods 106 to pinch a match plate 107 therebetween, in readiness for the molding.

The flask and thus the flask unit of the present invention can be used with a flaskless molding machine in that the flasks are removed after a mold is molded. Alternatively, they also can be used with a flask-molding machine in that the flasks need not be removed even after a mold is molded, and thereby the flasks containing the mold are conveyed on the molding line.

Figure 4:
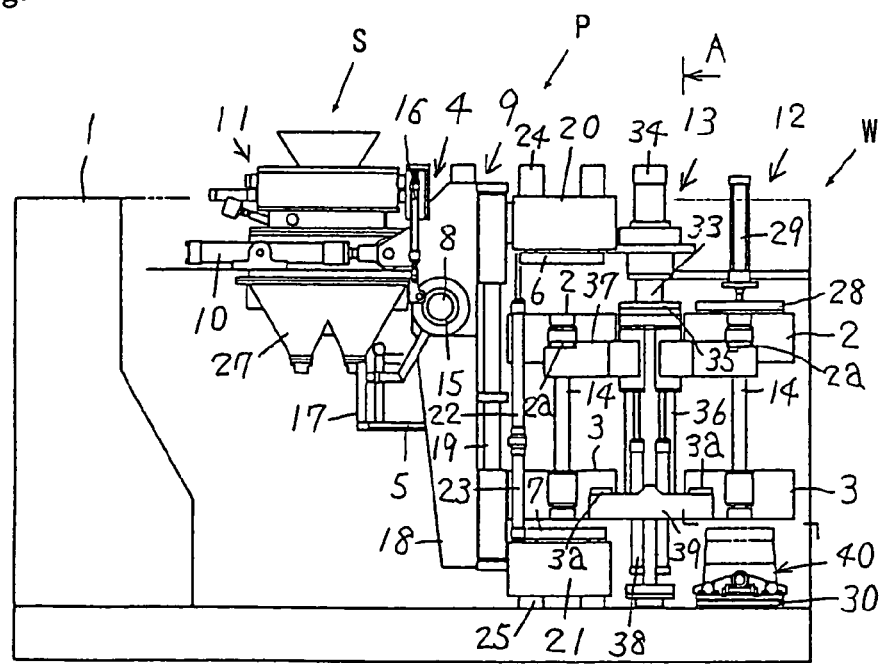
FIG. 4 shows a front view of an example of a molding machine that is applicable for the method of the present invention, partly cut away.
Figure 5:
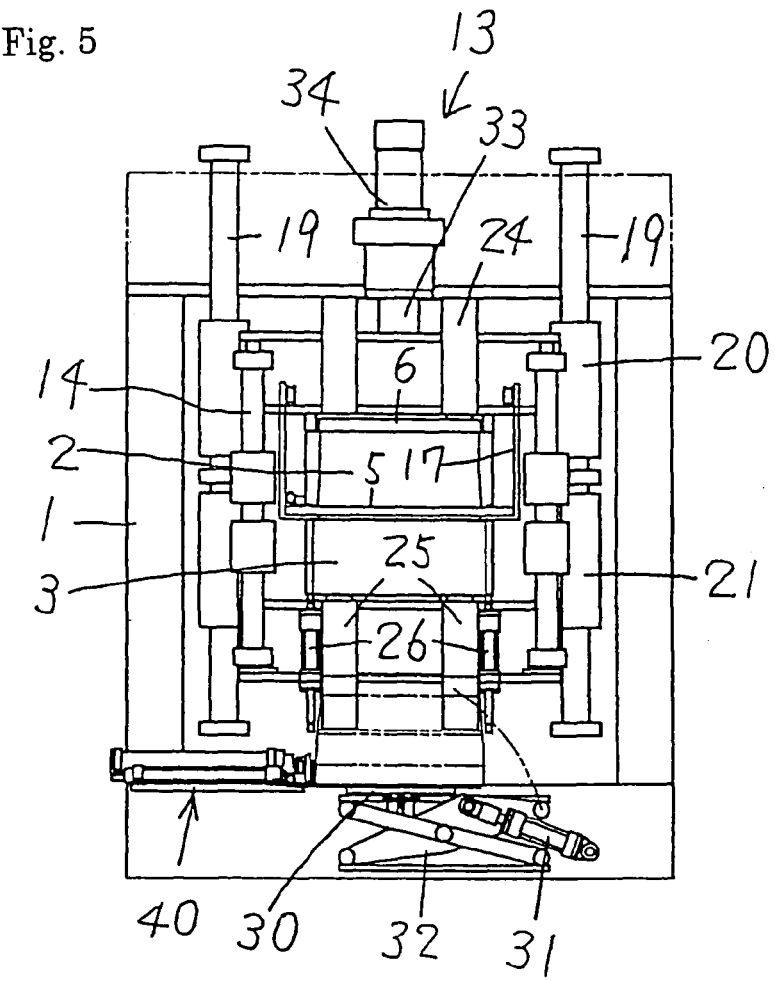
FIG. 5 shows a view taken along arrows A-A of FIG. 1, where the match plate is pinched between the upper flask and the lower flask of the flask unit.
Figure 6:
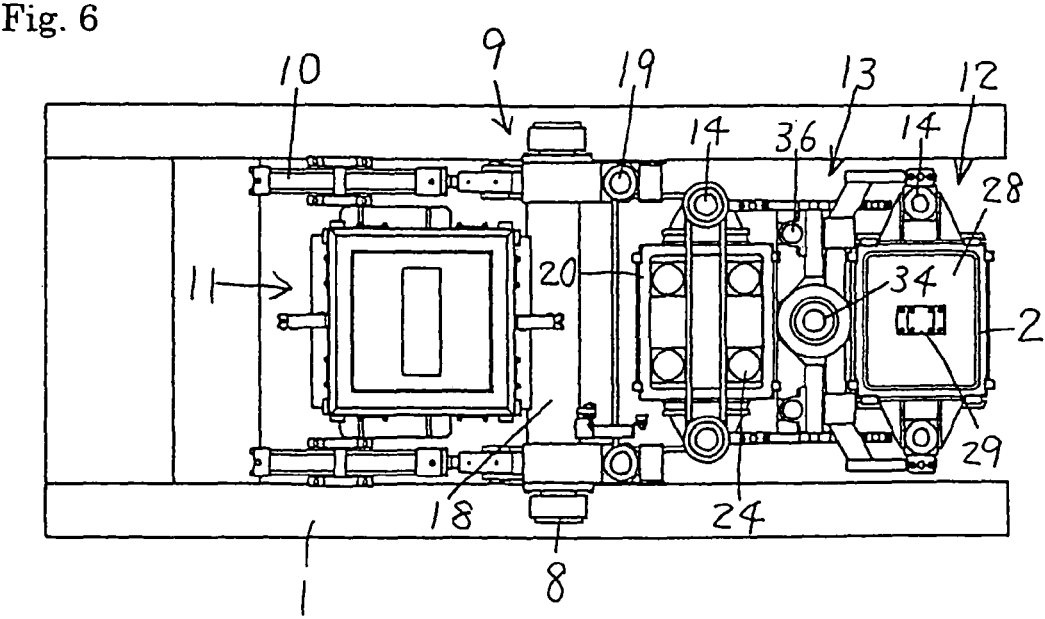
FIG. 6 shows a plane view of the molding machine of FIG. 4.
Figure 7:
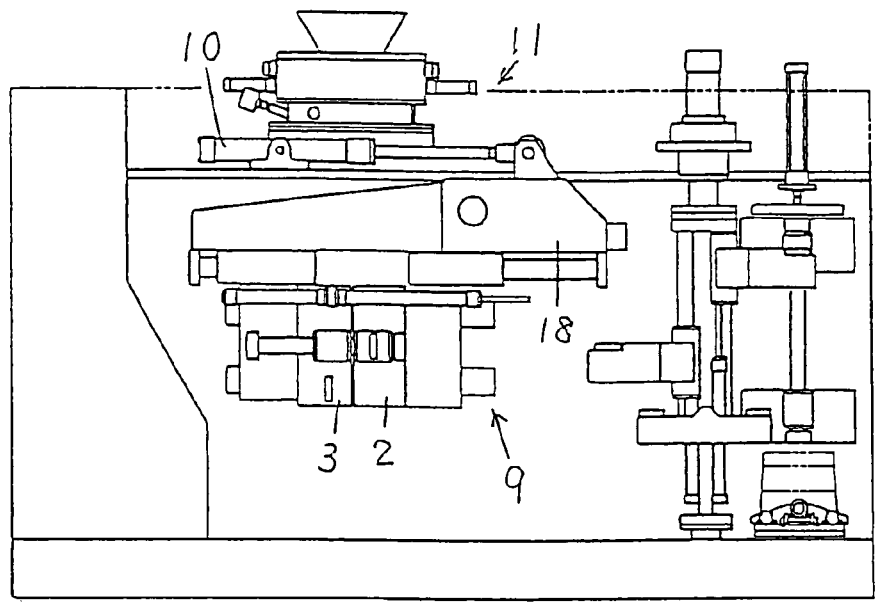
FIG. 7 is an illustrative sequence of the molding machine of FIG. 4 with a step of introducing molding sand into the flask units.

FIGS. 4, 5, and 6 show an example of a flaskless molding machine for which the flask unit as shown in FIGS. 2 and 3 can be used. In the flaskless molding machine, a defining station P for defining a molding space, a sand introducing station S, and a core fitting/mold drawing station W are integrally installed within the inner space of a rectangular base 1. The flask unit can be transferred to each station, i.e., it is not mechanically fixed on the fixed portion on the molding machine.

In the defining station P, two pairs of the paired upper and lower flasks 2 and 3, each flask having an inlet for introducing the molding sand from its sidewall, are placed. The defining station P includes a carrier 4 for carrying in and out a match plate 5 between the paired upper and lower flasks 2 and 3 of the two pairs of them, and a squeezing machine 9. Each upper flask 2, each lower flask 3, and the match plate 5 are the same as the upper flask 104, the lower flask 105, and the match plate 107, above described, respectively. They are formed as a flask unit.

The squeezing machine 9 is provided with an upper squeezing plate 6 and a lower squeezing plate 7 that are insertable in and drawable from the corresponding openings of one upper flask 2 and its mated lower flask 3. These openings are opposed to the match plate that is pinched between the paired upper and flasks 2 and 3. The squeezing machine 9 is rotatably supported by a supporting shaft 8, which stands on the base 1. The squeezing machine 9 is thus reversibly turnable about the supporting shaft 8 in the normal plane. The squeezing machine has a turning range between a position where the paired upper and lower flasks 2,3 and the pinched match plate 5 therebetween are in their vertical positions, and a position where they are in their horizontal positions. The defining station P also includes a horizontal cylinder 10 for reversibly turning the squeezing machine 9.

The sand introducing station S includes a sand introducer 11 for introducing the molding sand into the paired upper and lower flasks 2 and 3, which are already positioned in their vertical positions by the extending stroke of the cylinder 10, through their inlets.

The core fitting/mold drawing station W includes a mold drawer 12 for drawing an upper half-mold and a lower half-mold from the paired upper and lower flasks 2 and 3, which are already positioned in their horizontal positions and which overlap each other such that they contain the upper half-mold and the lower half-mold. The core fitting/mold drawing station W also includes a turning carrier 13 for alternatively and intermittently rotating two pairs of the horizontal upper and lower flasks 2 and 3 (each pair is composed of one horizontal upper flask 2 and one lower horizontal flask 3), one at a time. The turning carrier 13 has a turning range between the squeezing machine 9 that is in its horizontal position and the mold drawer 12. During this motion, one pair of horizontal upper and lower flasks and another pair of horizontal upper and lower flasks are disposed in a parallel relation in a vertical line. The mold drawer 12 also can be engaged with each upper flask 2 to move it up and down.

In each pair of the upper and lower flasks 2 and 3 of the two pairs, as shown in FIG. 4, a pair of connecting rods 14 is vertically positioned and slidably inserted in the front side and the rear side of the upper flask 2. The lower flask 3 is vertically and slidably supported on and across the connecting rods 14. The lower ends of the connecting rods 14 can be engaged with the lower flask 3. Each pair of upper and lower flasks 2,3 is taken as a flask unit together with a match plate to be pinched therebetween in a molding procedure.

The engaging members 2a and 3a, above described, can be supported by the turning carrier 13. For example, the engaging members 2a are attached to the center positions of the opposed sides of the upper flask 2, while the engaging members 3a are attached to the ends of the opposed sides of the lower flask 3 when it is in the squeezing machine 9. In this embodiment, as shown in the drawings, each engaging member 2a or 3a has a convex shape with a bore for receiving a pin (not shown) so as to be connected to a mating upper engaging member 37 or a mating lower engaging member 39 (described below) of the turning carrier 13. The form of each engaging member 2a or 3a may take any form that is suitable for being connected or attached to the mating upper engaging member 37 or the mating lower engaging member 39 of the turning carrier 9. For example, it may take a concave shape. Each engaging member 2a or 3a may be attached to the flanges 102 (FIG. 1) or may be attached to the body of the flask.

As shown in FIG. 4, the carrier 4 for carrying the match plate includes a ring member 15 that is fitted on the supporting shaft 8 of the squeezing machine 9, and a cylinder 16, which is pivotally attached to the sand introducer 11. The end of a piston rod of the cylinder 16 is pivotally connected to a portion of the ring member 15. The carrier 4 also includes a pair of cantilevered arms 17 whose base ends are attached to the ring member 15. The extending and contracting strokes of the cylinder 16 cause the paired cantilevered arms 17 to rotatably move up and down, to carry the match plate in and out between the horizontal upper flask 2 and the horizontal lower flask 3 in the squeezing machine.

In the squeezing machine 9, as shown in FIG. 4, a rotating frame 18 is rotatably fitted to the approximate center portion of the supporting shaft 8, which is mounted on the center of the upper surface of the base 1. The rotating frame 18 can thus be reversibly rotated in the vertical plane. The right side of the rotating frame 18 is provided with a pair of vertical, elongated guiding arms 19. The guiding arms 19 are positioned in a rear and front relation to each other to form a predetermined distance therebetween.

A reverse-L-shaped upper vertically-moving frame 20 and a reverse-L-shaped and vertically-moving frame 21 are vertically and slidably mounted on and across the upper portions and the lower portions, respectively, of two guiding rods 19, via holders, each of which is integrally provided with the corresponding frame 20 or 21. The upper vertically-moving frame 20 and the lower vertically-moving frame 21 can be moved close to and away from each other by the extending and contracting strokes of an upwardly-facing cylinder 22 and a downwardly-facing cylinder 23, respectively. These cylinders 22,23 are mounted on the rotating frame.

The upper vertically-moving frame 20 is provided with a plurality of cylinders 24 for advancing and retracting the upper squeezing plate 6, while the lower vertically-moving frame 21 is provided with a plurality of cylinders 25 for advancing and retracting the lower squeezing plate 7. The horizontal surface of each squeezing plate 6 or 7 has a cross section that suffices to press the corresponding upper or lower flask 2 or 3.

In this embodiment, the cylinders (driving means) for driving the squeezing plate (pressing means) cooperate to move with the rotation frame 18 in unison. Alternatively, the cylinders may be fixed on the fixed portions. Further, one group of cylinders of the squeezing plate 6 or 7 may cooperatively move with the rotation frame in unison, and the other group of cylinders, of the corresponding squeezing plate, may be fixed on the fixed portion.

The sand introducer 11, which is mounted on the top of the base 1 (near the left side in the figure), includes two aeration tanks 27 so as to separately introduce the molding sand into the upper flask 2 and the lower flask 3, while the introducing molding sand is floated or fluidized ("fluidized and introducing sand") by compressed air with a low pressure.

The fluidizing and introducing sand for floating or fluidizing the molding sand using the compressed air with the low pressure is disclosed in such as U.S. Pat. No. 6,749,003 B2, assigned to the applicant of the present application. It was found that the desirable pressures of the low-pressure air are in the range from 0.05 Mpa to 0.18 Mpa. However, a suitable introducing process that can be used for the present invention is not limited to the fluidizing and introducing process. Alternatively, a blowing introducing process using compressed air with the higher pressure and with or without lowering the pressure may be used in the present invention.

The mold drawer 12 includes a drawing plate 28, which is insertable in and retractable from the overlapped horizontal upper and lower flasks 2 and 3. That drawing plate 28 is attached to the lower end of the piston rod of a downwardly-facing cylinder 29 that is mounted on the roof of the base 1. The drawing plate 28 can be moved vertically by the extending and contracting strokes of the cylinder 29. Placed intermediately below the drawing plate 28 is a receiving table 30 for receiving an upper half-mold and a lower half-mold to be drawn from the upper flask 2 and the lower flask 3, respectively. The receiving table 30 can be moved vertically by a pantograph 32 that can be extended and contracted by the extending and contracting strokes of a cylinder 31 (see FIG. 5).

In the turning carrier 13, a vertically elongated, rotary shaft 33 is horizontally and rotatably mounted on the base 1. The upper end of the rotary shaft 33 is connected to the output of a motor 34, which is mounted on the top of the base 1. The rotary shaft 33 can be reversibly turned in a turning range of 180° by driving the motor 34.

The turning range of 180° is just an example of the turning ranges of the rotary shaft 33 for transferring the molded mold from the on-site position where the mold is molded to the drawer 12 by the rotation mechanism 13. Because this turning range is defined and based on the site where the drawer 12 is installed, it is not limited to the 180°. The drawer 12 may be installed in any site based on the desirable turning range of the shaft.

The upper portion of the rotary shaft 33 is provided with a supporting member 35 from which two pairs of guiding rods 36 are downwardly suspended. The guiding rods 36 are arranged in a rear and front relationship to form a predetermined distance therebetween such that they are opposed to each other across the rotary shaft 33 that is centered therebetween. An upper engaging member 37 is vertically and slidably fitted on each pair of the guiding rods 36 to engage the engaging members 2a. The upper engaging member 37 is attached to the distal end of the piston rod of the cylinder 38 that is mounted on the rotary shaft 33. The upper engaging member 37 can thus be vertically moved by the extending and contracting strokes of the cylinder 38. The lower ends of the two pairs of the guiding rods 36 are attached to a lower engaging member 39 that can be engaged to the engaging members 3a of the two lower flasks 3.

One of the functions of a mold ejector 40 is to push out the upper and lower half-molds, which are drawn from the upper and lower flasks 2 and 3, from the receiving table 30.

Figure 8:
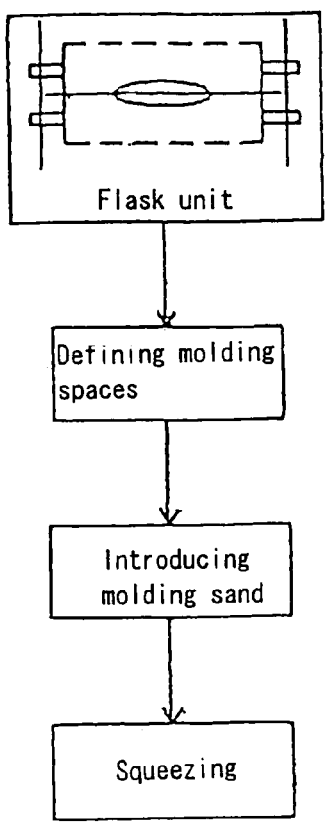
FIG. 8 is a flowchart that schematically illustrates a method of molding a mold of the present invention in a molding line that involves a flaskless molding machine.

The molding method of the present invention will now be described. First, a pair of molding spaces is defined by inserting a pair of the pressing members (the squeezing plates 6 and 7 in the embodiment of FIG. 4) to the openings of one flask unit. The molding sand is then introduced to the molding spaces. The pressing members are pressed into the molding sand to mold two half-molds (see FIG. 8).

In the molding method of the present invention, the flask unit may be transferred between a location where the molding spaces are defined and a location where the molding sand is introduced into the molding spaces. In this case, the introduced molding sand within the molding spaces can be pressed in the path on which the flask unit is transferred (see FIG. 9).

Figure 9:
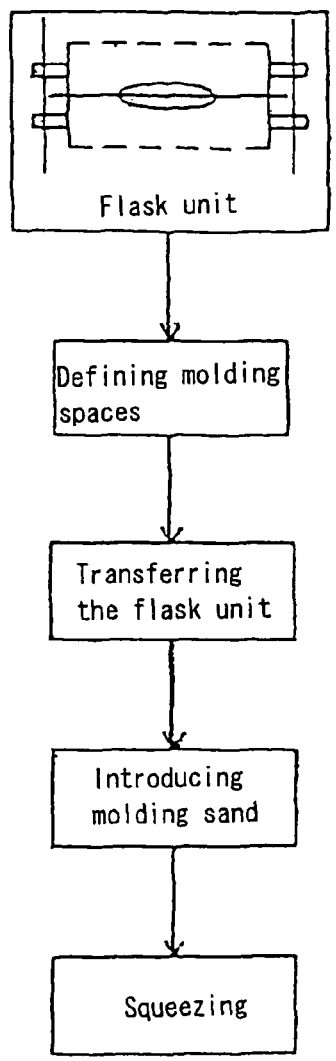
FIG. 9 is a flowchart that schematically illustrates an alternative method of molding a mold of the present invention in the molding line that involves the flaskless molding machine.

The molding method illustrated as in FIG. 9 will be in more detail described below, using the above flask unit and the flaskless molding machine, from the state as shown in FIG. 4, to mold the upper and lower half-molds, each of which has no flask.

First, in the defining station P, the match plate 5 is carried between the paired horizontal upper and lower flasks 2 and 3 via the paired arms 17 by the extending stroke of the cylinder 16 of the carrier 4.

The upper flask 2 and the lower flask 3 are then moved close to each other via the upper and lower vertical moving frames 20 and 21 by the contracting strokes of the upwardly-moving cylinder 22 and the downwardly-moving cylinder 23, respectively, of the squeezing machine. In this state, the upper and lower flasks 2 and 3 with the match plate 5 are formed as a flask unit that is integrally assembled by the connecting rods 14.

The plurality of the cylinders 24, 25 of the squeezing machine are extended by the predetermined length, while the match plate 5 is held between the paired upper and lower flasks 2 and 3. An upper molding space and a lower molding space are then defined by inserting the upper squeezing plate 6 and the lower squeezing plate 7 into the upper flask 2 and the lower flask 3, respectively, by the predetermined lengths, while the cylinder 10 is extended. The squeezing machine 9 is rotated about the supporting shaft in the clockwise direction such that the paired upper and lower flasks 2, 3, and match plate 5 are positioned at their vertical positions, and the sand inlets are raised (see FIG. 4).

If the height of the upper flask 2 is the same as that of the lower flask 3, the paired molding spaces may be simultaneously defined. Alternatively, if the height of the upper flask 2 differs from that of the lower flask, two molding spaces may be separately defined at the different timings.

In the sand introducing station S, the sand introducer 11 then introduces the molding sand into the paired upper and lower molding spaces through the inlets, using any suitable introducing method, such as aeration introducing with compressed air that has a low pressure (below atmospheric pressure).

In the defining station P, the paired upper and lower flasks 2, 3, and the match plate 5 are returned to their horizontal positions. During this movement, the upper squeezing plate 6 and lower squeezing plate 7, which are inserted in the upper flask 2 and the lower flask 3, respectively, are inserted further into the corresponding flasks to squeeze the molding sand within the upper molding space and the lower molding space. The upwardly-moving cylinder 22 and the downwardly-moving cylinder 23 are extended such that the upper vertically-moving frame 20 and the lower vertically-moving frame 21 are spaced apart from each other.

If just one defining of each molding space causes any insufficient introducing of the mold sand, at least one additional defining of each molding space may be carried out in the introducing step in order to improve the introducing of the molding sand. Of course, the defining of the molding spaces is preferably completed before the introducing step, to accelerate the rate of the molding.

In the core fitting/mold drawing station W, the upper flask 2, which contains a half-mold, which is produced by squeezing the molding sand, is lifted via the upper engaging member 37 to separate it from the match plate 5 by extending the cylinder 38 of the turning carrier 13. The lower flask 3 is disposed on the lower engaging member 39 of the turning carrier 39. The match plate 5 is then carried out from between the upper flask 2 and the lower flask 3 via the paired arms 17 by contracting the cylinder 16.

The motor 34 of the turning carrier 13 is driven to turn the rotary shaft 33 in a predetermined range such that the paired upper and lower flasks 2, 3, which contain the mold, are transferred to the mold drawer 12. A core is then fitted in each mold, if necessary. The cylinder 38 is then contracted to lower the upper flask 2 that contains the mold via the engaging member 37 such that the upper flask 2 overlaps the lower flask 3.

The cylinder 31 of the mold drawer 12 is then extended to rise on the receiving table 42 such that the lower flask 2 is disposed on the receiving table 42. The cylinder 41 is extended such that the paired upper and lower flasks 2, 3 that contain the half-molds are disposed on the receiving table 42. The cylinder 29 of the drawer 12 is then extended such that the drawing plate 28 contacts the half-mold in the upper flask 2. The cylinder 31 is then contracted to lower the drawing plate 28 and the receiving table 30 in a cooperative relationship to draw the half-molds from the paired upper and lower flasks 2, 3. The cylinder 31 is then contracted to the level in which the half-molds are to be ejected such that the ejector 40 is pushed off the paired upper and lower half-molds from the receiving table 40.

In the above-described processes, it is desirable that a core be fitted in each molded half-mold, if so needed. If so, a core is fitted in each molded half-mold before the upper flask 2 and the lower flask 3, each containing the molded half-mold, are rotated and thus transferred to the drawer 12. The paired upper and lower flasks 2, 3 are then caused to overlap each other to push out the half-molds, as described above.

Although this embodiment uses two pairs of the upper and lower flasks 2, 3, just one pair of the upper and lower flasks may be used. If the paired upper and lower flasks are used, the first (upper) and second (lower) squeezing plates for the upper flask 2 and the lower flask 3 are separately moved close to and away from the corresponding flasks, in a path. The path acts as such in that the paired flasks are transferred from a position where the molding sand is introduced into the molding spaces and a position where the molding spaces are completed. The molding sand can thus be so pressed to reduce the time that is needed in the molding processes. In this path, the first squeezing plate for the upper flask 2 and the second squeezing plate for the lower flask 3 are separately drawn from the corresponding flasks. Because this causes the molding rate to be increased, sufficient time to fit the cores can be obtained.

If the match plate 5 or 107 has patterns at both its surfaces, any suitable process for manufacturing the match plate may be employed. For example, a pattern plate that has a pattern at its side corresponding to the upper flask and a pattern plate that has a pattern at its side corresponding to the lower flask may be assembled or recycled and used in the resulting match plate by combining them such that their rear sides are opposed to each other.

Now, the embodiment for which the molding method of the present invention is applied to a flask-molding machine will be described. As schematically illustrated as in FIG. 10, a molding line based on the flask-molding machine includes the flask-molding machine 51, a pouring line 52, a mold disassembling device 53 for disassembling molds, and a recycling device 54 for recycling flasks. The flask-molding machine 51 molds an upper mold with a flask and a lower mold with a flask. The pouring line 52 pours to produce cavities in the molded upper and lower molds. The disassembling device 53 pushes out the molded molds from the upper and lower flasks. The recycling device 54 transfers upper and lower flask units 46 (see FIGS. 11 and 12, but described below) from the disassembling device 53 to the molding machine 51.

As shown in FIGS. 11 to 14, the molding machine 51 includes a rectangular base 1 having an inner space. In the inner space, a plurality of pairs of the upper and lower flask units 46 are housed. In each flask unit the upper flask 2 and the lower flask 3, each flask having an inlet for introducing the molding sand from its side wall, are connected to each other so as to move close to and away from each other. The upper flask 2, the lower flask 3, and each flask unit 46 are the same as those of the forgoing embodiments. A pattern plate such as the match plate 5, which has patterns at both its surfaces, is pinched between the upper flask 2 and the lower flask 3 of one flask unit 46 of the plurality of the upper and lower flask units. The pattern plate or the match plate 5 can be carried in and out of a position between the corresponding flasks by a carrier 4a. Because the pattern plate, however, is not limited to the match plate 5, it may be a pattern plate having a pattern at just one surface on its upper and lower surfaces.

A squeezing machine 9 that is housed within the inner space of the base 1 includes an upper squeezing plate 6 and a lower squeezing plate 7. Both are insertable in and drawable from the corresponding openings of the corresponding flasks. These openings are opposed to the match plate that is held between the upper flask 2 and the lower flask 3. The same as in the forgoing embodiments, the squeezing machine 9 includes a supporting shaft 8 on the base 1. The squeezing machine 9 also rotatably supports the upper flask 2, the lower flask 3, and the match plate 5 therebetween. They can thus be reversibly turned about the supporting shaft 8 in the normal plane between a position where they are in their vertical positions, and a position where they are in their horizontal positions.

The inner space of the base 1, which space is the same as in the forgoing embodiments, houses a horizontal cylinder 10 (a rotary driving mechanism) for reversibly turning or rotating the squeezing machine 9, and a sand introducer 11 for introducing the molding sand into the paired upper and lower flasks 2,3, which are positioned in their vertical positions by the extending stroke of the cylinder 10, through their inlets. The inner space of the base 1 also houses a turning carrier 13 for alternatively and intermittently rotating two pairs of the horizontal upper and lower flask units 46, and for engaging and vertically-moving the upper flask 2.

Located adjacent the right side of the turning carrier 13 is an alternative to the drawer 12 as in the forgoing embodiments, i.e., a transferring mechanism 12a for transferring the upper and lower flask units 46. The essential arrangements of the turning carrier 13 are substantially the same as those as in the forgoing embodiments. However, the turning carrier 13 has a turning range between the squeezing machine 9 in which the paired upper and lower flasks are positioned in their horizontal positions and the transferring mechanism 12a.

Figure 12:
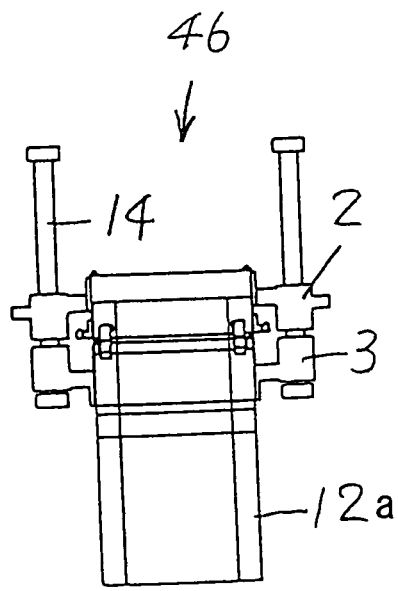
FIG. 12 shows a front view of a flask unit used in the flask-molding machine of FIG. 11.
Figure 13:
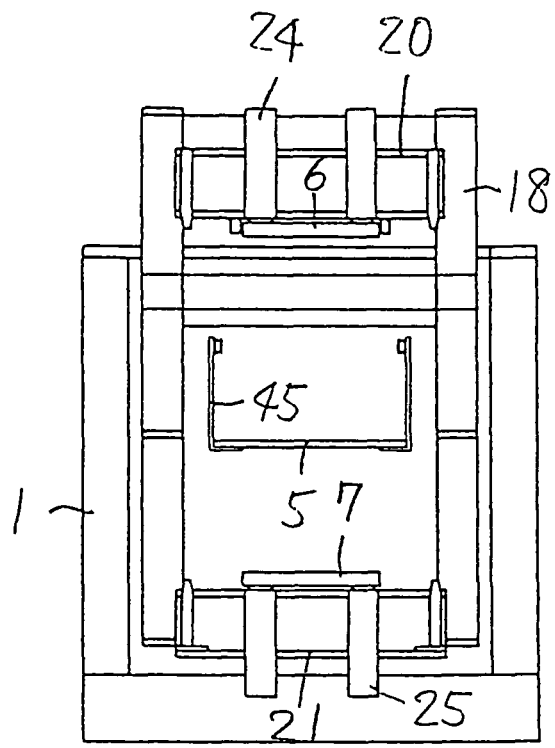
FIG. 13 shows a left-side front view of the flask unit of FIG. 12.
Figure 14:
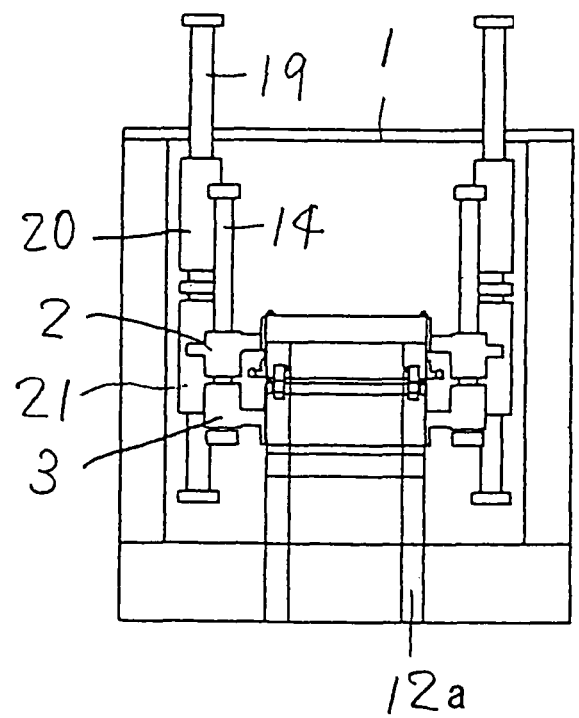
FIG. 14 shows a right-side front view of the flask unit of FIG. 12.

In each pair of the upper and lower flasks 2 and 3 of the plurality of pairs of the upper and lower flask units, as shown in FIG. 12, a pair of connecting rods 14 vertically, downwardly extends from the front side and the rear side of the upper flask 2. The lower flask 3 is vertically and slidably supported on and across the connecting rods 14. The lower ends of the connecting rods 14 can be engaged with the lower flask 3. Engaging members (not shown in FIG. 12, but they are the same as the engaging members 2a and 3a of FIG. 1, for example, each engaging member has a convex shape with a bore) are attached to the center positions of the opposed sides of the upper flask 2, and attached to the ends of the opposed sides of the lower flask 3 when it is in the squeezing machine 9.

Figure 11:
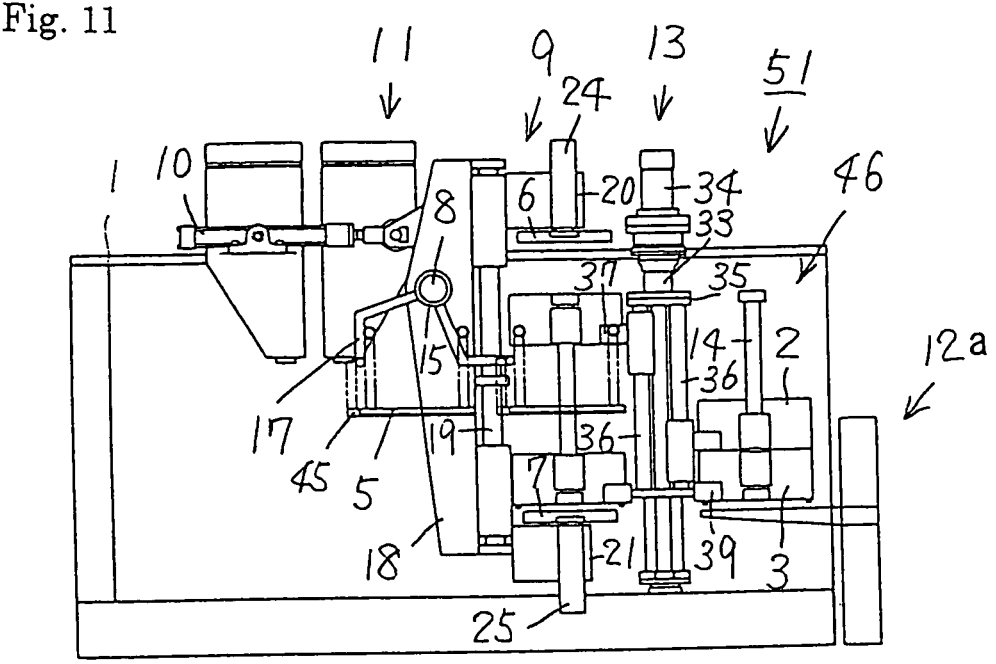
FIG. 11 shows a front view of the flask-molding machine of the molding line of FIG. 10.

As shown in FIG. 11, the carrying mechanism 4 for carrying the match plate includes a ring member 15, which is fitted on the supporting shaft 8 of the squeezing machine 9, and a cylinder (not shown in FIG. 11, but it is substantially the same as the cylinder 16 in the embodiments for the flaskless molding machine) whose piston rod at its end is pivotally connected to a portion of the ring member 15. The carrying mechanism also includes a pair of cantilevered arms 17 that are laterally rotated by the extending and contracting strokes of the cylinder, and a suspended track 45 that is laterally movable with the match plate 5 being placed on it.

In the squeezing machine 9, the rotating frame 18 is rotatably fitted to the approximate center portion of the supporting shaft 8 that is mounted on the center of the upper surface of the base 1. The rotating frame 18 can thus be reversibly rotated in the vertical plane. The right side of the rotating frame 18 is provided with a pair of the vertical, elongated guiding arms 19. The guiding arms 19 are positioned in respective front and rear positions to form a predetermined distance therebetween. The reversely L-shaped upper vertically-moving frame 20 and the reversely L-shaped vertically-moving frame 21 are slidably mounted on and across the upper portions and the lower portions, respectively, of the two guiding rods 19, via the holders, each of which is integrally provided with the corresponding frame 20 or 21.

The upper and lower vertically-moving frames 20 and 21 can be moved close to and away from each other by the extending and contracting strokes of an upwardly-moving cylinder and a downwardly-moving cylinder (neither shown in FIG. 11. However, they are substantially the same as the upwardly-moving cylinder 22 and the downwardly-moving cylinder 23 in the embodiments for the flaskless molding machine) that are mounted on the rotating frame.

The upper vertically-moving frame 20 is provided with a plurality of cylinders 24 for advancing and retracting the upper squeezing plate 6, while the lower vertically-moving frame 21 is provided with a plurality of cylinders 25 for advancing and retracting the lower squeezing plate 7. The horizontal surface of each vertically-moving frame 20 or 21 has a cross section that suffices to press the corresponding upper or lower flask 2 or 3.

Preferably, the sand introducer 11 is a pair of aeration introducers that separately introduces the molding sand into the upper flask 2 and the lower flask 3, while it floats or fluidizes ("fluidized introduction") the molding sand by compressed air with a low pressure (preferably, 0.05 Mpa to 0.18 Mpa). The two aeration introducers may be independently controlled and operated, operated at the same time, or controlled in the same manner.

As shown in FIG. 11, the turning carrier 13 has a vertical rotary shaft 33 that is horizontally and rotatably mounted on the base 1. The upper end of the rotary shaft 33 is connected to the output of a motor 34 that is mounted on the roof of the base 1 such that the rotary shaft 33 can be reversibly turned in the turning range of 180° by driving the motor 34. The upper portion of the rotary shaft 33 is provided with a supporting member 35 from which two pairs of guiding rods 36 are downwardly suspended in a rear and front relationship to form a predetermined distance therebetween such that they are opposed to each other across the rotary shaft 33 that is centered therebetween. Fitted on each pair of the guiding rods 36 is an upper engaging member 37 that can vertically slide on them to engage the engaging members 2a. Each upper engaging member 37 is attached to the corresponding distal end of the piston rod of a cylinder (not shown) that is mounted on the rotary shaft 33. The upper engaging member 37 can thus be vertically moved by the extending and contracting strokes of the cylinder. The lower ends of the two pairs of the guiding rods 36 are attached to lower engaging members 39 that can be engaged to the engaging members of the two lower flasks 3.

Figure 10:
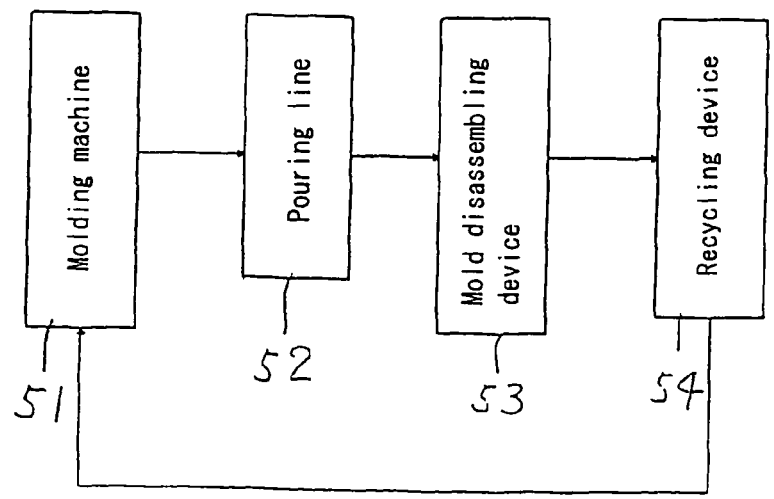
FIG. 10 shows a schematic block diagram of a molding line that involves a flask-molding machine that is applicable for the molding method of the present invention.

The molding method will now be described, using the above flask unit and the flask-molding machine, from the state as shown in FIG. 10, to mold upper and lower half-molds and thus to mold a mold.

Figure 15:
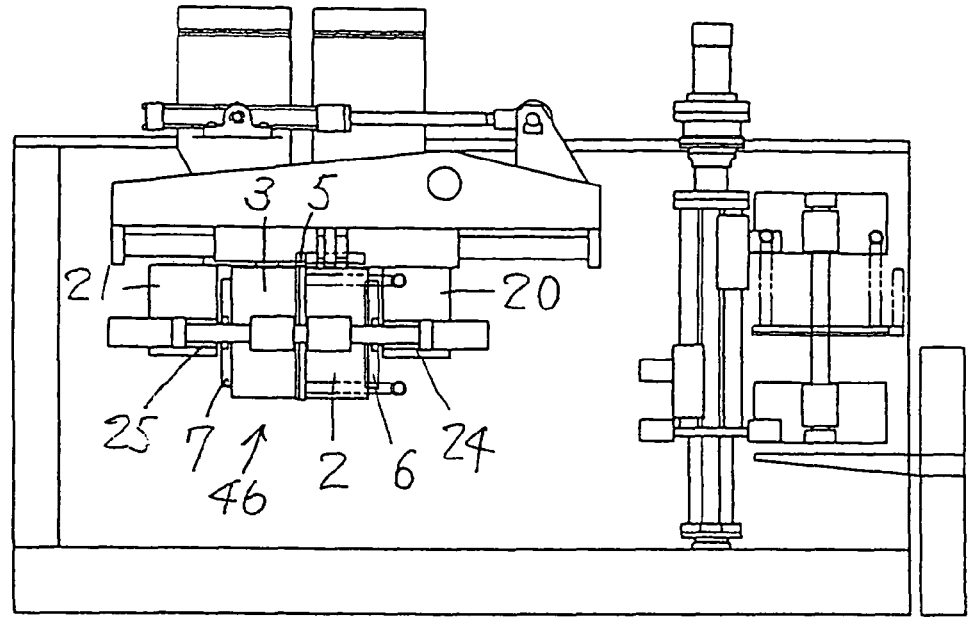
FIG. 15 is an illustrative sequence of the molding machine of FIG. 11 with a step of introducing molding sand into the flask units.

First, the carrier 4 is carried on the match plate 5 into a position between the horizontal upper flask 2 and the horizontal lower flask 3 of the upper and lower flask units 46 by the track 45. The upper flask 2 and the lower flask 3 are then moved close to each other via the upper and lower vertical moving frames 20 and 21 by the contracting strokes of the upwardly-moving cylinder and the downwardly-moving cylinder, respectively, of the squeezing machine 9. The plurality of the cylinders 24, 25 of the squeezing machine are extended by a predetermined length, while the match plate 5 is held between the paired upper and lower flasks 2 and 3. An upper molding space and a lower molding space are then defined by inserting the upper squeezing plate 6 and the lower squeezing plate 7 into the upper flask 2 and the lower flask 3, respectively, by the predetermined lengths. The squeezing machine 9 is turned about the supporting shaft 8 in the clockwise direction by the extending and contracting strokes of the cylinder 10 such that the paired upper and lower flasks 2, 3, and match plate 5 are positioned at their vertical positions. At the same time, the sand inlets are raised such that they contact the lower end of the sand introducer 11 (see FIG. 15).

The sand introducer 11 then introduces the molding sand into the paired upper and lower molding spaces through the inlets. The paired upper and lower flasks 2, 3, and the match plate 5 are then returned to their horizontal positions. During this motion, the upper squeezing plate 6 and lower squeezing plate 7 are further inserted into the corresponding flasks to squeeze the molding sand within the upper molding space and the lower molding space. The upwardly-moving cylinder and the downwardly-moving cylinder are extended such that the upper vertically-moving frame 20 and the lower vertically-moving frame 21 are separated from each other. The upper flask 2, which contains a half-mold, which is produced by squeezing the molding sand, is lifted via the upper engaging member 37 to separate it from the match plate 5 by extending the cylinder of the turning carrier 13. The lower flask 3 is disposed on the lower engaging member 39 of the turning carrier 39.

The match plate 5 is then carried out from between the upper flask 2 and the lower flask 3 via the track 45 by contracting the cylinder 16 (followed by a core being fitted in each molded half-mold, if so needed). The cylinder is then contracted to lower the upper flask 2 that contains the half-mold via the engaging member 37 such that the upper flask 2 overlaps the lower flask 3. The motor 34 of the turning carrier 13 is driven to turn or rotate the rotary shaft 33 in the predetermined turning range such that the paired upper and lower flasks 2 and 3, each containing the half-mold, are transferred to the transferring mechanism 12a. The recycling device 54 feeds the upper and lower flask units 46 to the molding machine 51, the pouring line 52, and the mold dissembler 53 in turn by means of the transferring mechanism 12a. Then the flask units 46 are recycled through the molding machine.

The forgoing embodiments are just for illustrating purposes, but are not intended to be any limitation. Accordingly, various changes could be made in the above embodiments without departing from the scope of the invention defined by the appended claims.

Although the present invention can be applicable to either a flaskless molding machine or a flask-molding machine, its design is not limited to that as shown in the appended drawings. Although the pressing means of the molding machines are shown as the squeezing plates 6 and 7 in the embodiments, they may be replaced with upper and lower squeezing feet that are vertically movable by means of a plurality of driving sources. Hydraulic cylinders are suitable for the driving sources of the pressing means, if high power is needed. If not, the air cylinders may desirably used. Electrical motors may also be preferably used, since they need no hydraulic piping system and thus the freedom in selecting the site for the installation of the molding machine can be increased.

The invention claimed is:

1. A method for molding using a flask unit to be incorporated in a flaskless molding machine that has a pair of pressing members for pressing molding sand, wherein the flask unit is adapted to be the flaskless molding machine for simultaneously making an upper mold and a lower mold, wherein said flask unit has two flasks for holding said molds, respectively, such that said flasks are turnable in the vertical plane while each flask approaches, and retreats from, the other one, each flask comprising a body that defines an opening in which a sand mold is to be molded and each having an inlet for introducing said molding sand into said opening, two mounting members, each integrally provided on opposite sides of each body of each flask for mounting said flasks on a pair of connecting arms that integrally connect one flask to another flask to form said flask unit so that the one flask and the other flask can be moved between a position where they are opposed to, and a position spaced apart from, each other by sliding the mounting members of each body of each flask along the connecting arms, while the bodies are supported at both their opposite sides by said connecting arms, wherein said connecting arms are arranged on a centerline of said opposite sides of said bodies of said flasks such that the connecting arms are opposed to each other, and wherein each body or each mounting member of each flask has an engaging member for engaging an actuator outside of said flask such that a force or forces from said actuator can be transmitted to said flask, said method comprising the steps of:

moving the flasks of the flask unit toward each other from the spaced apart position to the opposed position by sliding said opposed mounting members of the body of each flask along said connecting rods of the flask unit;

defining a pair of molding spaces by inserting each pressing member into each opening of the body of said two flasks of said flask unit;

introducing molding sand into said pair of molding spaces through said inlets of said bodies;

moving said flask unit back and forth between a position where said defining step is carried out and a position where said introducing step is carried out; and molding a half-mold in each flask of said flask unit to form a pair of half-molds by pressing said introduced molding sand with said pressing members, wherein said molding step is carried out while said flask unit is being moved back to said defining step position.

2. The method of claim 1, including a step of moving said pair of half-molds in said flasks to a position where a core is to be fitted within each half-mold after said molding step.

3. The method of claim 1, including a step of moving said pair of half-molds in said flasks to a position where a mold formed from said pair of half-molds is removed from the flask unit.

4. The method of claim 1, wherein said defining step simultaneously defines said pair of molding spaces.

5. The method of claim 1, wherein said defining step defines one molding space and the other molding space of the pair of molding spaces at different times.

6. The method of claim 1, wherein said defining step is completed before said introducing step.

7. The method of claim 1, wherein said introducing step includes at least one additional defining step.

* * * * *